Aug. 18, 1964     N. A. GETTINO ETAL     3,145,357
EXPANSION CHAMBER FOR ORIENTING LIQUID LEVEL
Filed July 10, 1961
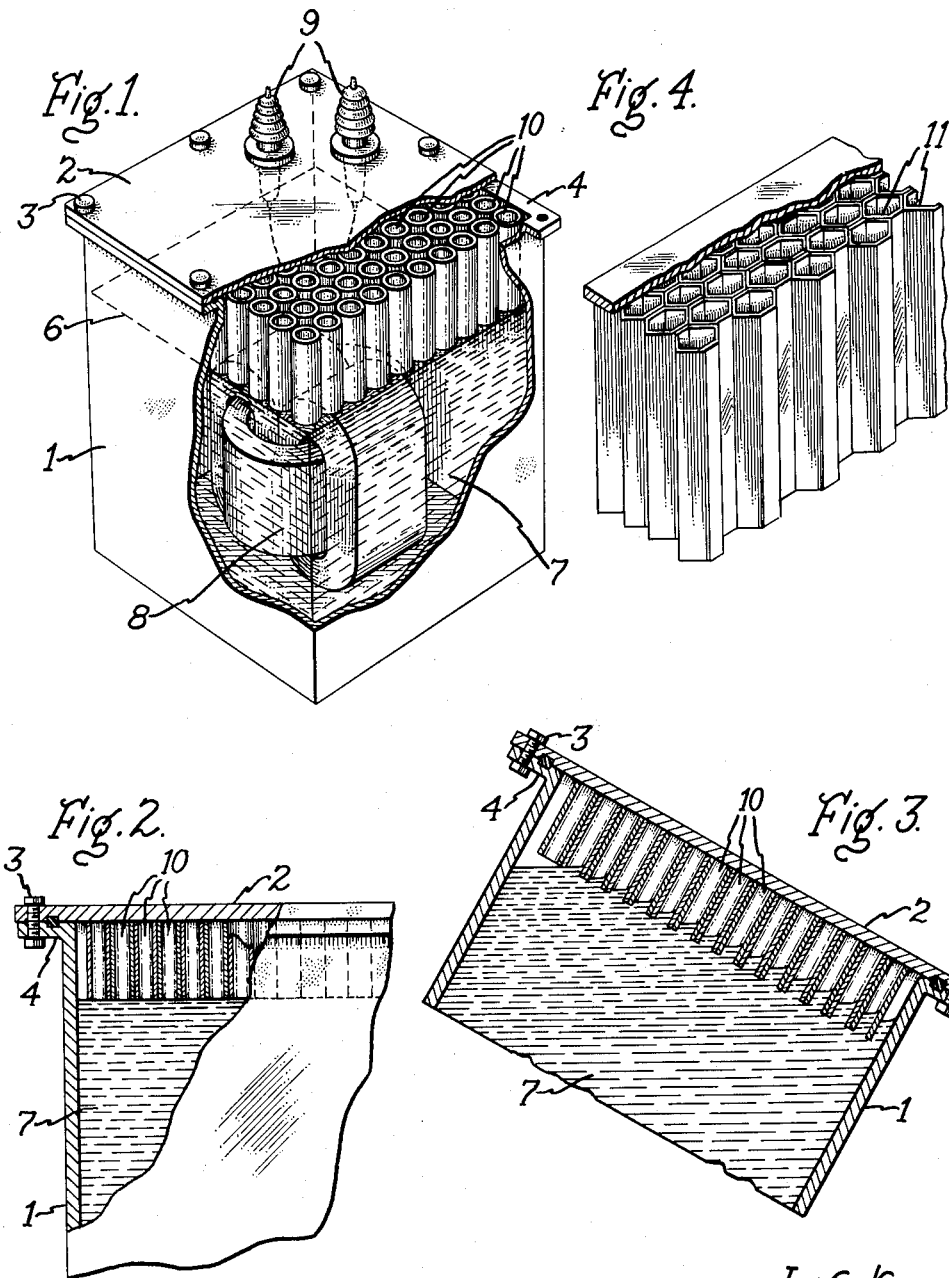
Inventors,
Nicholas A. Gettino,
Arthur F. Murphy,
by Gilbert P. Tarleton
Their Attorney.

United States Patent Office 3,145,357
Patented Aug. 18, 1964

3,145,357
EXPANSION CHAMBER FOR ORIENTING
LIQUID LEVEL
Nicholas A. Gettino, Syracuse, and Arthur F. Murphy,
North Syracuse, N.Y., assignors to General Electric
Company, a corporation of New York
Filed July 10, 1961, Ser. No. 122,903
2 Claims. (Cl. 336—94)

This invention relates to expansion chambers for closed fluid systems and more particularly to an improved expansion chamber for controlling the orientation of the level of liquid in a tiltable sealed container.

Many kinds of manufactured articles comprise a sealed enclosure containing a liquid. An example is an electric transformer in which the liquid serves both as electrical insulation and a heat transfer medium. Because changes in temperature of the liquid produced by changes in ambient temperatures or changes in heat developed by the transformer or both cause the liquid to expand, it is necessary to provide additional space for this expansion. However, this increases the over-all size of the enclosure and this is a serious disadvantage in many situations where available space is severely limited. By extending the sides of the enclosure vertically above the liquid level, the vertical height of the expansion chamber, and hence the vertical dimensions of the enclosure can be kept to a minimum for any given volume of expansion space without increasing the lateral dimensions of the enclosure. It is usual practice to fill the expansion chamber with a compressible gas at near atmospheric pressure rather than having a vacuum because the latter would require a stronger tank to withstand the outside atmospheric pressure.

Such arrangements are satisfactory if the container or enclosure remains in a normal vertical position. However, certain requirements, such as specifications of some of the Armed Forces, often require that the apparatus function properly when tilted in any direction from its normal vertical position through a substantial angle such as 45°. This requirement coupled with the limitation on dimensions creates a difficult design problem because as the liquid level stays horizontal when the enclosure tilts, parts of the electrical apparatus are apt to become uncovered and hence uninsulated and uncooled by the liquid with the result that failure of the apparatus is likely to occur.

In accordance with this invention, we provide means for effectively making the liquid level tilt with the tilting of the enclosure or casing. This is accomplished by filling the expansion chamber with a plurality of thinned wall hollow cells which are open at the bottom near the normal liquid level and which are closed at the top. These cells trap the air or other gas which is in the expansion chamber so that whenever liquid tries to rise in any cell as a result of tilting of the enclosure, the gas in that cell is compressed and as the specific gravity of insulating and cooling liquid is comparatively low the liquid level in that cell is prevented from rising any more than a small fraction of the distance it would otherwise rise if the top end of the cell were not closed. It follows that as the liquid level cannot rise appreciably in any cell as a result of tilting of the enclosure it cannot fall appreciably in relation to any other cell from the same cause, the total volume of liquid being constant. Consequently, the orientation of the liquid level with respect to the enclosure and its contents remains substantially the same throughout the wide angle of tilt in any direction.

An object of this invention is to provide means for causing the liquid level in an expansion chamber to tilt through substantially the same angle as the liquid container is tilted through.

Another object of this invention is to reduce the vertical height and volume of a tiltable liquid insulated apparatus having an expansion chamber.

It is believed that the invention will be better understood from the following description taken in connection with the accompanying drawing, and its scope will be pointed out in the appended claims.

In the drawing:

FIGURE 1 is a partly broken away perspective view of an embodiment of the invention, FIGURE 2 is a partly broken away partly sectionalized elevation view of the embodiment shown in FIGURE 1, FIGURE 3 is a view similar to FIG. 2 showing the action of the invention when the apparatus is tilted, FIGURE 4 is a perspective of a modification.

Referring now to the drawing, and more particularly to FIG. 1, there is shown therein a casing or enclosure 1 having a removable top 2 which is attached to the casing by means of bolts 3 passing through a flange 4 in the rim of the casing and which is sealed to the casing by means of a compressible gasket 5. The casing is filled with liquid to the level 6 when the apparatus is in its normal vertical position as illustrated in FIGS. 1 and 2. The liquid is indicated by the reference numeral 7. Submerged in the liquid is any suitable electrical apparatus, such for example as a transformer core and coil assembly 8, external electrical connections to which may be made in any suitable manner such as through insulated terminals or bushings 9 mounted on the cover 2.

The space in the tank 1 between the cover 2 and the normal liquid level 6 constitutes an expansion chamber for the liquid and in order to control the orientation of the container with respect to the liquid level when the container is tilted, this expansion chamber is filled with a plurality of thin walled hollow cells 10 which are sealed closed at the top adjacent the inner side of the cover 2 and which are open at the bottom in the vicinity of the liquid level.

Gas such as air or nitrogen occupies the space in the cells.

When the casing 1 is tilted as shown in FIG. 3 the liquid of course tries to rise higher and higher in the cells which tend to have their lower ends submerged deeper and deeper in the liquid, but this is prevented to any material extent by a combination of compression of the gas which is trapped in those cells and the comparatively low specific gravity of the insulating and cooling liquid which is ordinarily mineral oil or askarel. As the liquid cannot rise very far in any of the cells due to tilting, it follows that the liquid level cannot fall very far in or below the lower ends of any of the cells, the volume of the liquid being constant. Consequently the resulting incremental levels are somewhat as shown in FIG. 3, and the average or effective level of the liquid as a whole tends to tilt through almost the same angle that the container 1 tilts. Consequently, the height of the liquid above the electrical apparatus 8 remains substantially constant throughout the angles of tilt so that such tilt does not adversely affect the insulating and cooling of the apparatus.

In FIG. 4 the cellular structure instead of being a plurality of separate parallel cylinders is a unitary honeycombed like structure 11.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. In combination, electrical apparatus, an enclosing casing for said apparatus, insulating and cooling liquid in said casing, said casing having a normal position in which the level of said liquid is above said apparatus, expansion space in said casing above the normal level of said liquid, and means for maintaining a relatively fixed orientation of said apparatus and the effective level of said liquid when said casing is tilted away from said normal position comprising a plurality of hollow cells extending from the top of said casing to the vicinity of the normal level of said liquid, said cells being closed at the top and open at the bottom, said cells collectively substantially filling said expansion space.

2. Encased liquid filled electrical apparatus having a gas space above the liquid level to allow for thermal expansion of said liquid, said apparatus having a normal position but being subject to substantial tilting in all directions from said normal position, and means for permitting a reduction in distance between the level of said liquid and the top of said apparatus when in said normal position without allowing any part of said apparatus to be uncovered by said liquid when said apparatus is tilted comprising a hollow cellular structure filling said gas space, the axes of said cells being vertical when said apparatus is in its normal untitled position, said cells being closed at the top and open at the bottom near the surface of said liquid so that when said apparatus is tilted gas pressure in said cells will prevent said liquid from rising substantially in any cell and therefore from falling substantially in any other cell.

References Cited in the file of this patent
UNITED STATES PATENTS

| | | |
|---|---|---|
| 1,347,769 | Wilkinson | July 27, 1920 |
| 1,394,143 | Coolidge | Oct. 18, 1921 |